US009334130B2

(12) United States Patent
Weber et al.

(10) Patent No.: US 9,334,130 B2
(45) Date of Patent: May 10, 2016

(54) TRANSFER DEVICE FOR TRANSFERRING BULK MATERIAL

(75) Inventors: Helmut Weber, St. Ingbert (DE); Peter Röttgen, Pulheim (DE); Wei Ye, Saarbrücken (DE)

(73) Assignee: Thyssenkrupp Resource Technologies GmbH, Essen (DE)

( * ) Notice: Subject to any disclaimer, the term of this patent is extended or adjusted under 35 U.S.C. 154(b) by 127 days.

(21) Appl. No.: 14/241,943

(22) PCT Filed: Aug. 10, 2012

(86) PCT No.: PCT/EP2012/065749
§ 371 (c)(1),
(2), (4) Date: Mar. 21, 2014

(87) PCT Pub. No.: WO2013/029969
PCT Pub. Date: Mar. 7, 2013

(65) Prior Publication Data
US 2014/0212245 A1    Jul. 31, 2014

(30) Foreign Application Priority Data
Aug. 31, 2011  (DE) .......................... 10 2011 111 510

(51) Int. Cl.
*B65G 67/60* (2006.01)
*B63B 27/00* (2006.01)
*B63B 35/00* (2006.01)
*B63B 35/30* (2006.01)

(52) U.S. Cl.
CPC ................ *B65G 67/60* (2013.01); *B63B 27/02* (2013.01); *B63B 35/00* (2013.01); *B63B 35/301* (2013.01)

(58) Field of Classification Search
CPC ...... B63B 35/00; B63B 35/30; B63B 35/301; B63B 35/305; B63B 27/02; B65G 67/62
USPC ......... 114/27, 31, 32, 33, 34, 38, 45, 73, 263; 414/137.1, 139.4, 139.8, 140.6, 140.9
See application file for complete search history.

(56) References Cited

U.S. PATENT DOCUMENTS

| 232,316 | A | * | 9/1880 | Tracy | .................... | B63B 35/301 |
|---|---|---|---|---|---|---|
| | | | | | | 114/32 |
| 1,823,172 | A | * | 9/1931 | Schon | ...................... | E02C 5/00 |
| | | | | | | 414/140.6 |
| 1,967,246 | A | | 7/1934 | Kaltenbach | | |
| 2,628,727 | A | * | 2/1953 | Anschutz | ............. | B65G 67/606 |
| | | | | | | 114/34 |

(Continued)

FOREIGN PATENT DOCUMENTS

DE          407399 C      4/1925
DE          417363 C      8/1925

(Continued)

*Primary Examiner* — Kaitlin Joerger
(74) *Attorney, Agent, or Firm* — Laurence A. Greenberg; Werner H. Stemer; Ralph E. Locher

(57) ABSTRACT

A transfer device is configured for transferring bulk material from a barge floating on a body of water into at least one receiving device. At least one lifting lock is provided by way of which the barge can be raised, while floating, to a tilting height above the surface of the body of water, and at least one tilting device is provided by way of which the barge can be tilted such that the bulk material is poured from the barge into the receiving device.

19 Claims, 6 Drawing Sheets

(56) References Cited

U.S. PATENT DOCUMENTS

Figure 1:
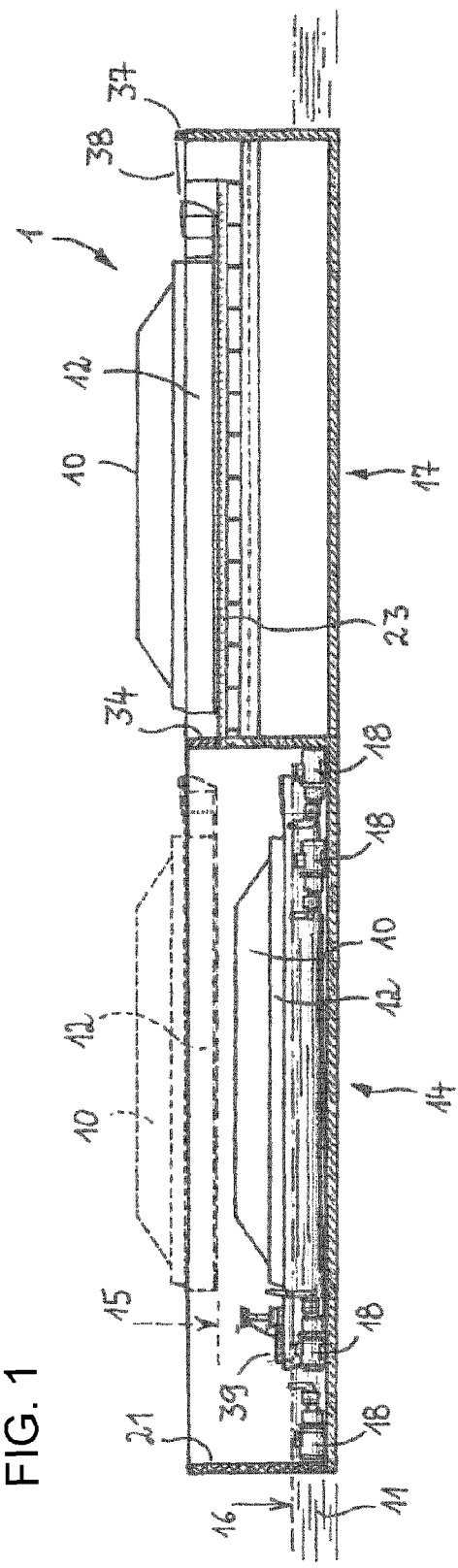

| | | | | |
|---|---|---|---|---|
| 3,428,193 A | * | 2/1969 | Miller | B65G 67/00 414/140.6 |
| 3,687,307 A | * | 8/1972 | Macrander | B65G 63/006 414/140.6 |
| 3,835,802 A | | 9/1974 | Vernede et al. | |
| 4,382,418 A | * | 5/1983 | Ray | B63B 35/00 114/263 |
| 4,659,275 A | * | 4/1987 | Goodwin | B63B 35/30 114/38 |
| 4,671,725 A | * | 6/1987 | Evans | B63B 35/30 210/525 |
| 5,020,956 A | * | 6/1991 | Marsden | B63B 35/301 414/138.1 |

FOREIGN PATENT DOCUMENTS

| | | |
|---|---|---|
| DE | 1930771 A1 | 4/1971 |
| DE | 2021653 A1 | 1/1972 |
| EP | 0161054 A1 | 11/1985 |
| GB | 477625 A | 1/1938 |

\* cited by examiner

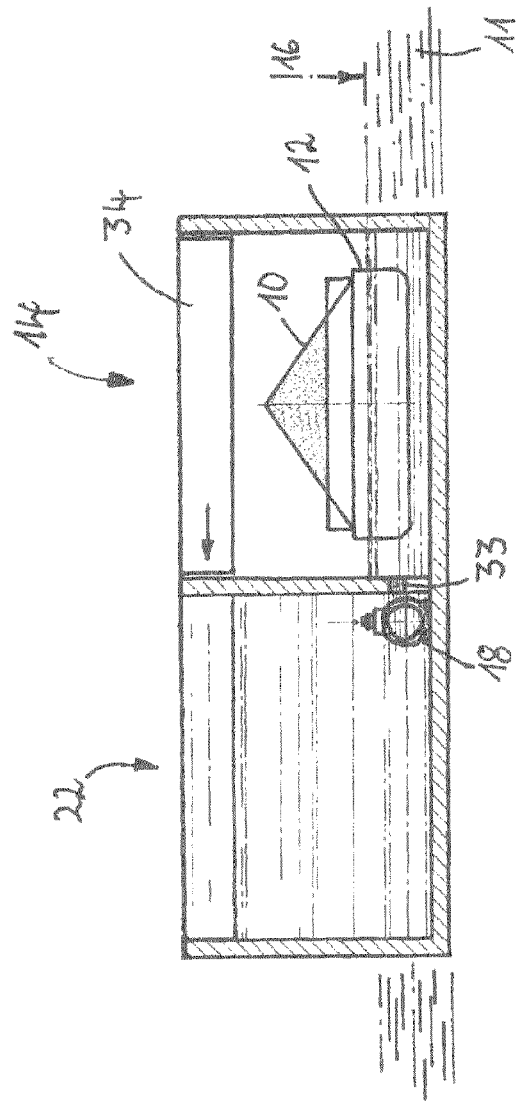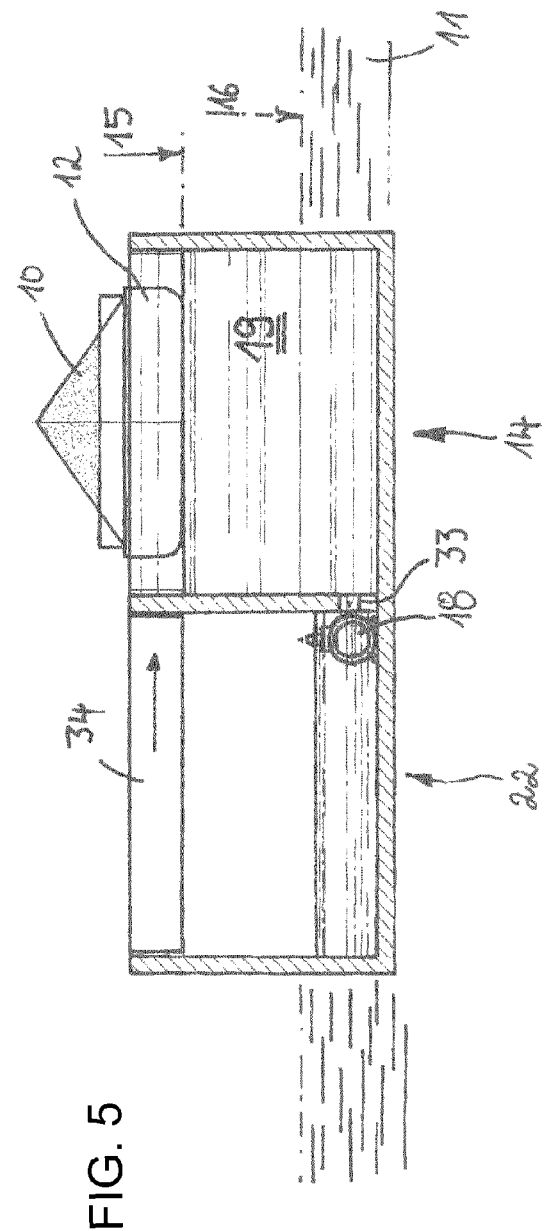
FIG. 4
FIG. 5

TRANSFER DEVICE FOR TRANSFERRING BULK MATERIAL

BACKGROUND OF THE INVENTION

1. Field of the Invention

The present invention relates to a handling device for transferring bulk material from a barge floating in a body of water into at least one receiving device, and to a method for this purpose.

2. Prior Art

From EP 0 161 054 A1 a generic transfer device for transferring bulk material is known. The barge shown is rolled over a supporting surface so that the barge attains an angle of rotation at which the bulk material is conveyed from the barge to a receiving device, for example to a bin system. In order to impart the rolling motion to the barge, a crane facility is used, and the barge is first slightly raised, with the use of a traction means, and is then transferred to the rolling motion by way of the supporting surface. This arrangement is associated with disadvantages as a result of the design of the transfer device as a dry dock, wherein barges of the type of interest in this context can attain a length of, for example, 100 metres and more, and can, together with the bulk material, for example attain a weight in excess of 25,000 metric tons. If the transfer device is designed as a dry dock, said dry dock needs to be dimensioned correspondingly. Consequently, significant constructional effort is used to build a corresponding dry dock. In addition, the barge needs to be moved into the receiving device and first needs to be drained so that the barge can subsequently be tilted.

From U.S. Pat. No. 4,659,275 A1 a further transfer device for transferring bulk material from a barge floating in a body of water is known, wherein the transfer device itself is designed so as to be floating and is formed by a cylinder into which the barge can be moved. This arrangement is associated with considerable disadvantages in the sealing of the cylinder and in the removal of the bulk material from the receiving device, wherein said bulk material must first be placed into intermediate storage before it can be conveyed onwards, for example on land or on water. Such a system, too, is not usable with barges of the above-described dimensions and the above-described weight; in particular the system is associated with a disadvantage in that the receiving device receives the bulk material far below the barge, and subsequently, by way of corresponding conveyor means, the bulk material must be conveyed to a higher level.

DISCLOSURE OF THE INVENTION

It is thus the object of the present invention to create a transfer device for transferring bulk material from a barge to a receiving device, which transfer device overcomes the disadvantages of the state of the art described above, and which transfer device is of a simple design and obviates the need to construct a dry dock.

This object is met starting from a transfer device for transferring bulk material as claimed. Advantageous improvements of the invention are stated in the dependent claims.

The invention includes the technical teaching that at least one lifting lock is provided, by means of which the barge can be raised, while floating, to a tilting height above the surface of the body of water, and that at least one tilting device is provided by means of which the barge can be tilted such that the bulk material is poured from the barge into the receiving device.

The transfer device according to the invention, by raising the barge above the surface of the water, obviates the need for the transfer device having to be constructed to considerable depth. If, as known from the state of the art, the transfer device were to be designed as a dry dock, such a dry dock would need to be dimensioned correspondingly, wherein in the case of the arrangement of the transfer device in a body of water, disadvantageously, very substantial hydrostatic buoyancy forces would arise. In particular, the transfer device would have to be constructed, at depth, to far below the surface of the body of water, as a result of which considerable buoyancy forces would arise if the transfer device is designed as a dry dock. It is only as a result of the raising, according to the invention, of the barge above the surface of the body of water that it is no longer necessary to provide a dry dock, and a situation is achieved in which the bulk material discharged from the barge merely can be poured, to the corresponding receiving device, to a height level that corresponds to that of the surface of the body of water or slightly below the surface of the water. By simply pouring the bulk material into the receiving device from a height level that is situated above the surface of the body of water the onward transport of the bulk material from the receiving device is also simpler, and no substantial height difference has to be overcome for the onward conveyance of the bulk material.

It is advantageous if for raising the barge a lifting lock is used so that the barge can be raised while floating to the tilting height. Such locks are in principle known in flowing bodies of water, and water can be let into the lock to raise a vessel from a body of water with a low surface of the body of water to a body of water with a higher surface of the body of water, or to lower a vessel from a body of water with a high surface of the body of water to a body of water with a lower surface of the body of water. According to the invention this advantageous possibility is used for raising the barge, which is raised while floating, to the tilting height in that the lifting lock is correspondingly filled with water. By a subsequent transfer to the tilting device the barge can be conveyed to the necessary tilting height already by the lifting lock, and consequently the emptying of the barge by the adjacent tilting device can take place in a very short time.

Advantageously, the tilting device is arranged so as to be adjacent to the lifting lock, wherein in particular the lifting lock and/or the tilting device are/is designed to be resting on the bottom, in particular mounted on or resting against the bottom of the body of water. The transfer device essentially comprises the lifting lock and the tilting device, and either the lifting lock or the tilting device, but preferably both of them, can be designed so as to be mounted on the bottom. Despite the bottom-mount design, there is no need to construct a dry dock, because according to the invention the barge is raised above the surface of the body of water before the bulk material is poured from the barge. However, the transfer device can comprise a foundation by which the lifting lock and/or the tilting device is supported. In principle, the transfer device can also be arranged so as to be adjacent to a bank of the body of water, and consequently at least part of the transfer device can also be arranged on land.

According to an advantageous embodiment of the transfer device, at least one pump is provided, by means of which water can be pumped into the lifting lock in order to raise the barge, while floating, to the tilting height by pumping water into the lifting lock. In the same manner the water can be discharged from the lifting lock in order to lower the discharged barge from the tilting height to the surface of the body of water. In particular, several pumps can be provided, by means of which water can be pumped into the lifting lock in order to increase the pumping capacity and in order to reduce the time necessary for raising the barge to the tilting height. In this arrangement the at least one pump can be designed as an electrically operated pump.

The lifting lock can comprise a basic structure with a lock gate through which the barge can be moved into the lifting lock and moved out of the lifting lock, wherein the basic structure and in particular the lock gate is designed so as to be waterproof to such an extent that water can be received to at least a height in the basic structure, at which height the barge has been raised, while floating in the water, to the tilting height. The lifting lock can for example, comprise two walls, provided so as to be spaced apart from each other, wherein a further end wall provides a waterproof seal with the two walls arranged parallel to each other. On an open side of the lifting lock the lock gate can be arranged that, for example, comprises a double-leaf design, wherein the leaves of the lock gate can be hingeably arranged on the side walls. As an alternative, the lock gate can be designed as a sliding gate, wherein the lock gate according to this embodiment can also be designed to provide a waterproof seal with the side walls.

According to a further advantageous embodiment of the lifting lock according to the invention, a reservoir for receiving water can be provided, wherein water can be conveyed from the lifting lock to the reservoir, and water can be conveyed from the reservoir to the lifting lock. In this arrangement the reservoir can be arranged so as to be adjacent to the lifting lock, wherein between the lifting lock and the reservoir a shared partition wall can be provided. In this arrangement the at least one pump can be arranged in the reservoir and/or in the lifting lock, and consequently the pumps can also be designed as submersible pumps.

It is particularly advantageous if the reservoirs are designed according to the principle of a saving lock, with the reservoirs comprising several individual reservoirs at different height levels. In a saving lock, apart from the actual lock chamber, there are additional open reservoirs, which are staggered in height. When the lifting lock is discharged, according to the physical law of communicating pipes, the saving reservoirs are filled sequentially from the top to the bottom, with only the remainder of the water flowing into the body of water. Conversely, during the filling process, the lifting lock is first filled starting with the water from the lowermost reservoir, with only the "upper" remainder being added by pump action. While, in contrast to pumping empty the lifting lock, it is not possible to retain or save the entire volume of water, nevertheless, as a result of the difference in height the water quasi "by itself" flows into the reservoirs or back into the lifting lock. Consequently a considerable quantity of energy can be saved.

The at least one partition wall can comprise at least one channel, by means of which, in particular with the pump, water can be moved to and fro between the lifting lock and the reservoir. For example, if the lifting lock is full of water so that the barge is at the tilting height, the reservoir can be empty. If the discharged barge with the water in the lifting lock is lowered to the height of the surface of the body of water, then during the discharging of the water from the lifting lock the water can be moved into the reservoir. Moving the water from the lifting lock into the reservoir takes place at least until such time as the water surface in the lifting lock corresponds to the water surface in the reservoir. After the barge has been lowered to the height of the surface of the body of water, in order to raise a further loaded barge the water from the reservoir, which has been filled to at least half its capacity, can be conveyed into the lifting lock again, and consequently the total amount of energy required for raising the barges is reduced.

Between the lifting lock and the tilting device a movable lock wall can be provided, and the lock wall can be openable in order to transfer the barge between the lifting lock and the tilting device. Furthermore, the tilting device can comprise a basic structure that is designed, in particular, so as to be adjacent to the basic structure of the lifting lock, and/or integral and/or merging into one another. The basic structure of the tilting device and/or the basic structure of the lifting lock can comprise a steel construction or a steel-concrete construction which is placed on the bottom of the body of water with foundations. In this arrangement neither the basic structure of the tilting device, nor the basic structure of the lifting lock needs to be designed as a dry dock, and as an alternative to the foundations the basic structures could also be anchored to the bottom of the body of water by means of piers or columns.

According to a further advantageous embodiment, in particular, a tilting floor can be provided in the tilting device, which tilting floor is tiltably received, by a tilt joint, in the basic structure of the tilting device. In this arrangement the tilting floor can, in particular together with the barge, comprise a centre of gravity that is arranged such that the gravitational direction and the pivot of the tilt joint are laterally offset relative to each other. Thus, in the non-tilted state, the tilting floor with the barge can assume a stable position in the basic structure. The lateral offset between the centre of gravity, or the gravitational direction of the loaded barge, and the tilting floor relative to the tilt joint can be selected such that for tilting the tilting floor at first the common centre of gravity needs to be raised slightly until the centres of gravity of the loaded barge and of the tilting floor coincide with the pivot of the tilt joint.

The tilting device can comprise a drive unit for tilting the tilting floor, in particular together with the loaded barge, wherein the drive unit can comprise at least one driven pinion that meshes with a gear rim arranged on the tilting floor. The tilting floor can comprise an arc segment that preferably extends around the pivot, and the gear rim can be arranged on the arc segment, wherein the driven pinion can be incorporated in the basic structure of the tilting device. Thus the drive unit with the pinion is arranged so as to be fixed in the basic structure, and the arc segment can move past the drive unit as a result of the tilting of the tilting floor. Due to the large mass of the tilting floor and of the loaded barge, several drive units with respective pinions and respectively associated gear rims can be provided, wherein, for example, a plurality of pinions that rotate in a common axis of rotation can be rotatably held in the basic structure of the tilting device.

The tilting device can, in addition to or as an alternative to the drive unit, comprise a water chamber that is incorporated in the basic structure of the tilting device and that is partially movably delimited by the tilting floor. If the volume of water present in the water chamber changes, for example as a result of the action of a pump or of an outlet valve, as a result of the change in the volume of water in the water chamber a tilting movement can be induced in the tilting floor around the tilt joint. In this arrangement it is necessary to manufacture the water chamber so that it is pressure-proof, wherein according to this exemplary embodiment the offset between the resulting centre of gravity of the tilting floor and of the barge with the bulk material and the pivot of the tilt joint must be designed in such a manner that the tilting movement commences as soon as the water is discharged below a section of the tilting floor. As a result of this, the tilting floor, in the horizontal arrangement in which the barge can be transferred to the tilting floor and can subsequently be removed from the tilting floor, can comprise an unstable equilibrium, and, for example, a mechanical locking arrangement can be provided to prevent the tilting floor from inadvertently tilting.

According to an advantageous embodiment of the receiving device, the aforesaid can comprise at least one bin into which the bulk material can be poured, wherein at least one conveyor is provided, by means of which the bulk material can be conveyed from the bin. Because of the length of the barge a plurality of bins, arranged side by side, can form the receiving device, and from each bin a conveyor, for example in the form of a conveyor belt, can convey the bulk material to a further, common, belt, before finally transporting the bulk material out of the receiving device.

The object of the present invention is further met by a method for transferring bulk material from a barge floating in a body of water into at least one receiving device by means of a transfer device, wherein raising of the barge with a lifting lock is provided, by means of which the barge is raised, while floating, to a tilting height above the surface of the body of water, and wherein tilting of the barge with a tilting device is provided so that the bulk material is poured from the barge into the receiving device. When the barge is empty, the tilting device can tip the barge back to the horizontal position, and the barge can be moved back to the lifting lock and can be lowered into the body of water so that the barge can be moved, while floating, from the lifting lock. Subsequently the next barge can be moved into the lifting lock and can be emptied in the same manner.

After the barge has been raised by the lifting lock, said barge can be transferred to the tilting device, wherein a lock wall is moved from an arrangement that separates the lifting lock from the tilting device. The lock wall is situated between the lifting lock and the tilting device in an upper region that, in particular, is situated above the tilting floor of the tilting device. Since the barge was raised, while floating, to the tilting height, by means of the lock wall an additional volume of water can be received in the lifting lock in order to raise the barge, while floating, to the tilting height and in order to keep the barge at this height. Subsequently, various options can be provided for transferring the barge from the lifting lock to the tilting device.

A first possibility for transferring the barge from the lifting lock to the tilting device requires a tilting device with a tilting floor, which tilting floor is designed to hold water so that after the lock wall has been deployed the water level of the lifting lock and of the tilting device is identical so that the barge can be transferred, while floating, from the lifting lock to the tilting device. In this arrangement the volume of water that is held in the tilting floor can remain on the tilting floor after the barge has been moved out, in order to move a subsequent loaded barge, while it is floating, over the tilting floor.

According to a further possibility for transferring the barge from the lifting lock to the tilting device, a supporting floor can be introduced to the lifting lock, onto which supporting floor the barge, at its tilting height achieved while floating, is placed in that a certain volume of water is discharged, wherein the supporting floor can have a height that corresponds to the height of the tilting floor so that the barge is transferred, with the use of a drive means, from the supporting floor to the tilting floor, in particular after the lock wall has been opened. The supporting floor can laterally move into the lifting lock, or it can be arranged on the inside of the lifting lock and can correspondingly be pivoted underneath the barge or in some other manner moved underneath the barge. If some of the water is discharged from the lifting lock, in particular into the reservoir situated in a lower position, the barge can sink slightly in order to touch down on the supporting floor. In this arrangement the supporting floor, in particular, however, also the tilting floor of the tilting device, can comprise rolling elements by means of which the barge can roll over the supporting floor and over the tilting floor. In this manner the transfer of the barge from the lifting lock to the tilting device is facilitated with the use of the drive means.

In a further improvement the transfer device can comprise two lifting locks, wherein on both sides of the lifting locks the barges are reciprocally transferred to the tilting device. According to this method, the transfer capacity of the transfer device is further improved. In this arrangement it can be provided for the raising of the at least one barge with the at least one lifting lock and the tilting of the at least one barge with at least one tilting device to take place simultaneously.

PREFERRED EXEMPLARY EMBODIMENTS OF THE INVENTION

Figure 2:
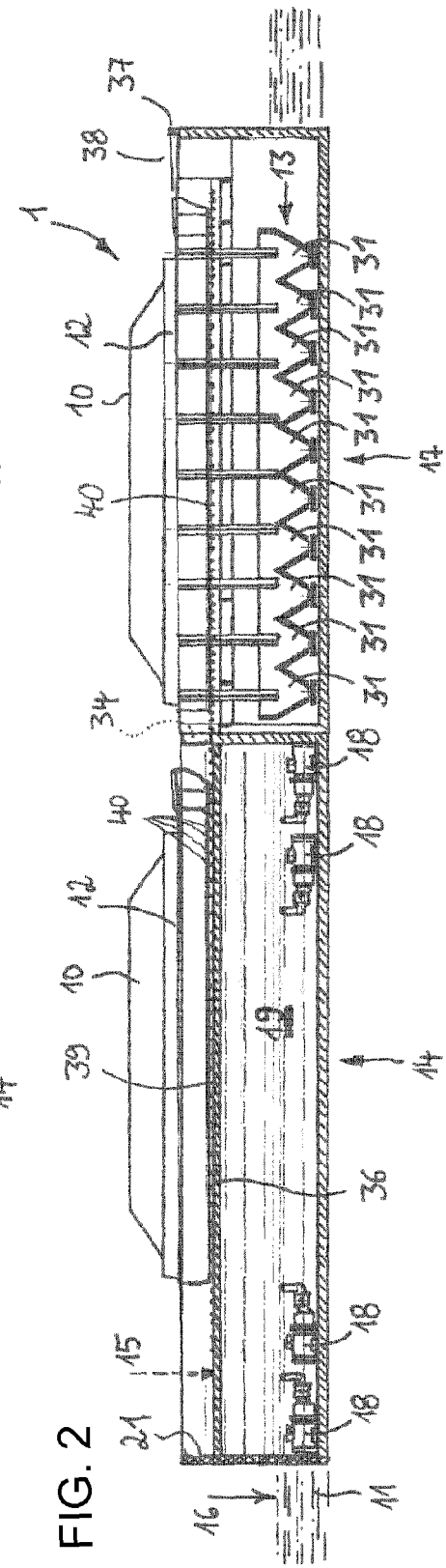
Figure 3:
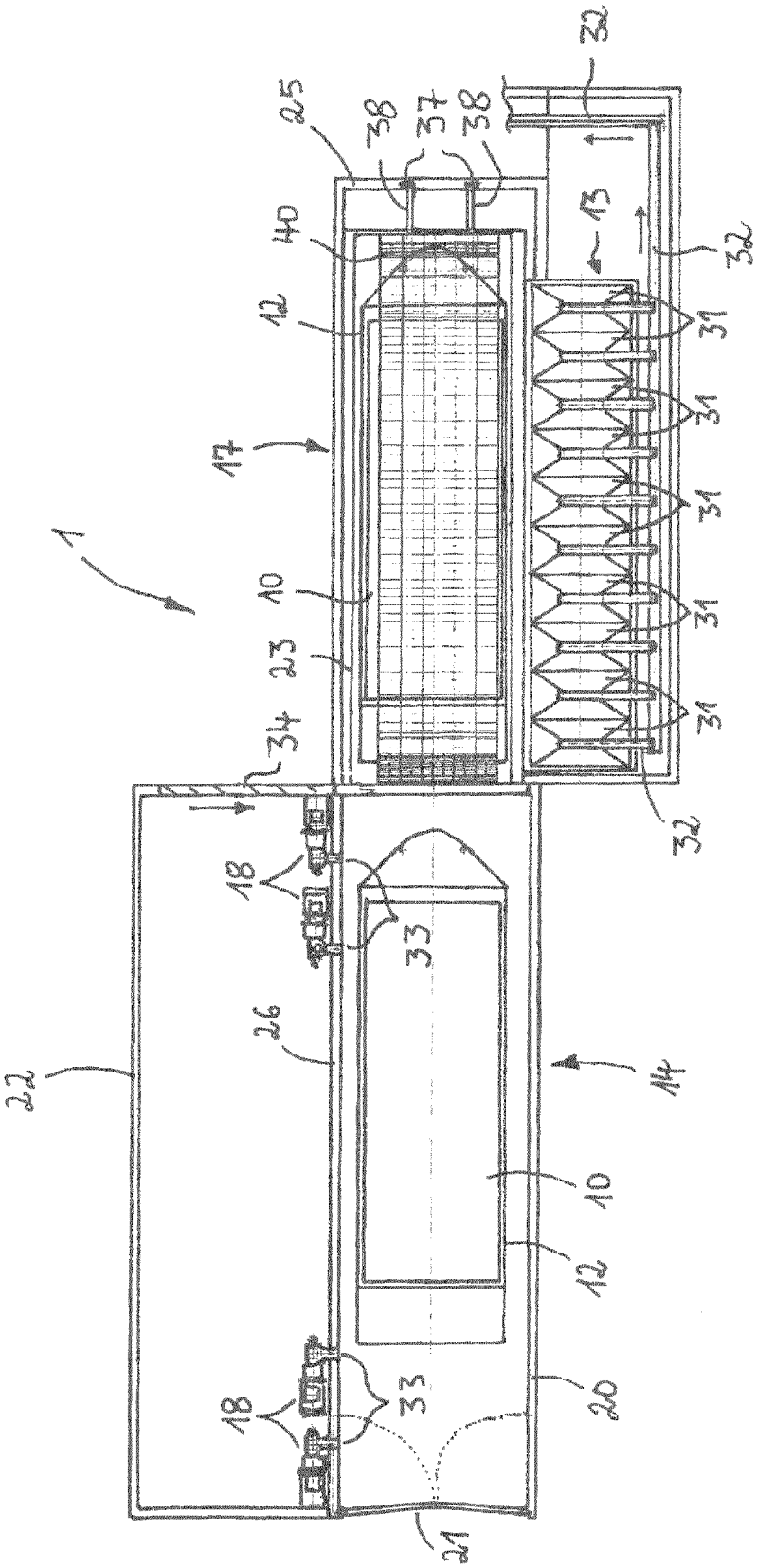
Figure 6:
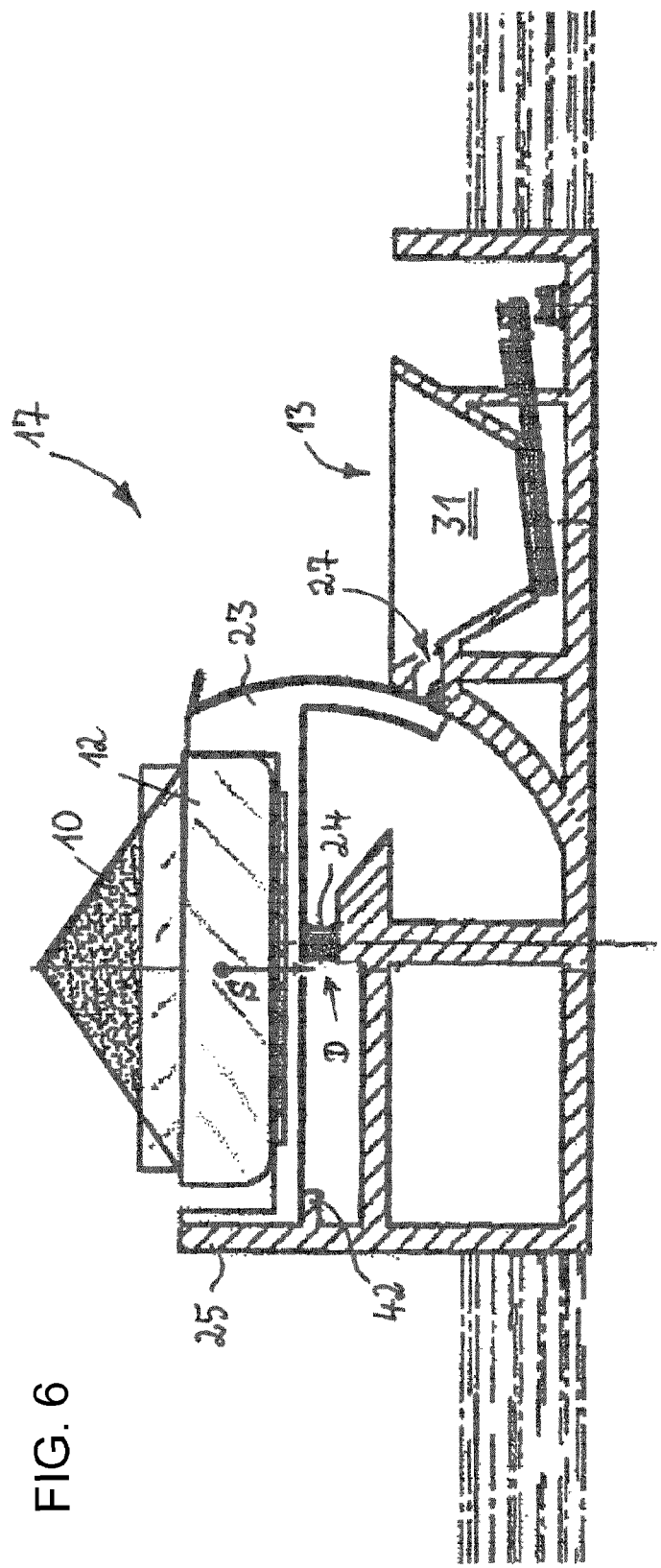
Figure 7:
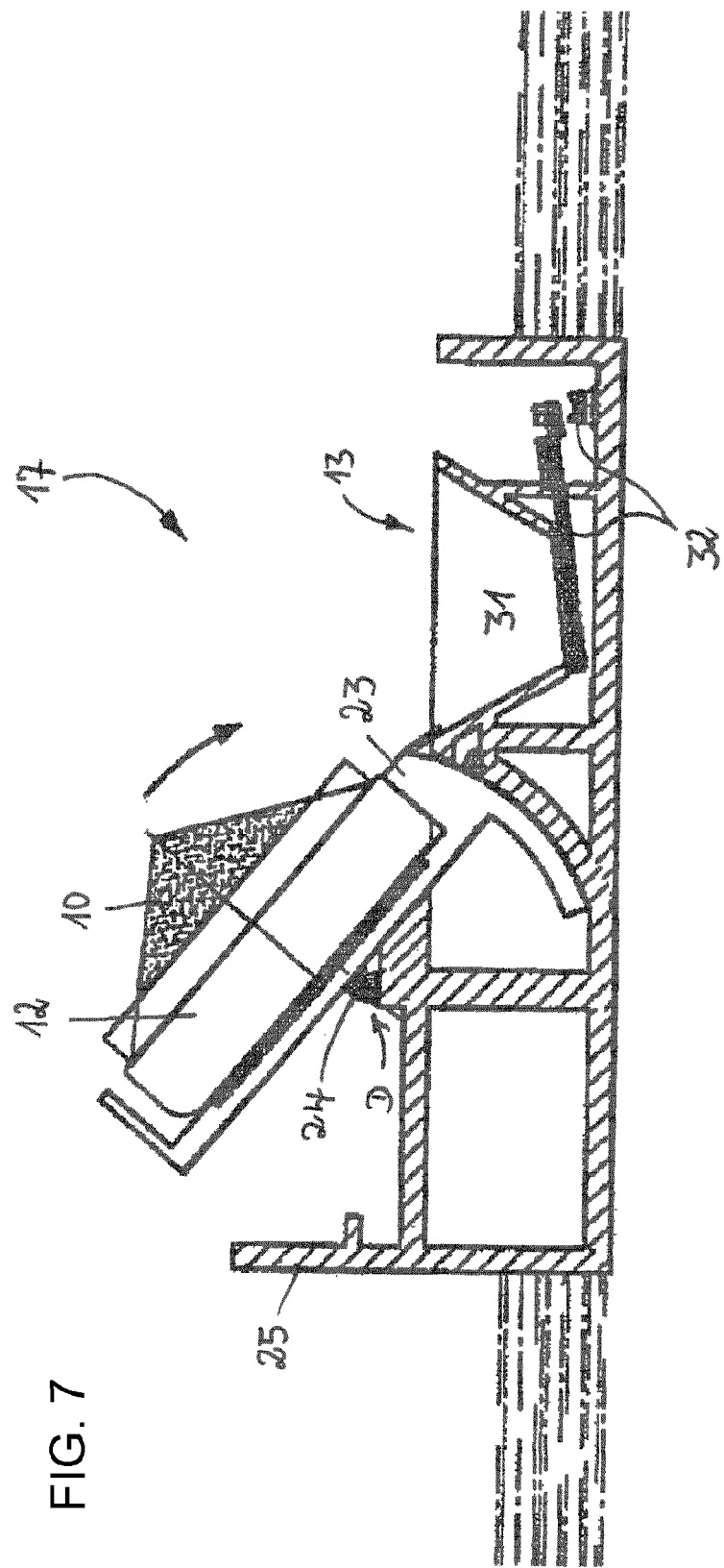
Figure 8:
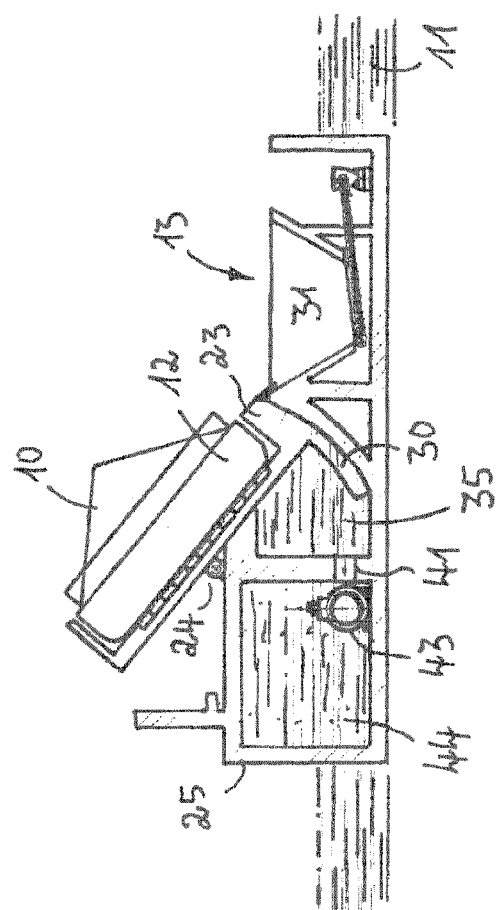
Figure 9:
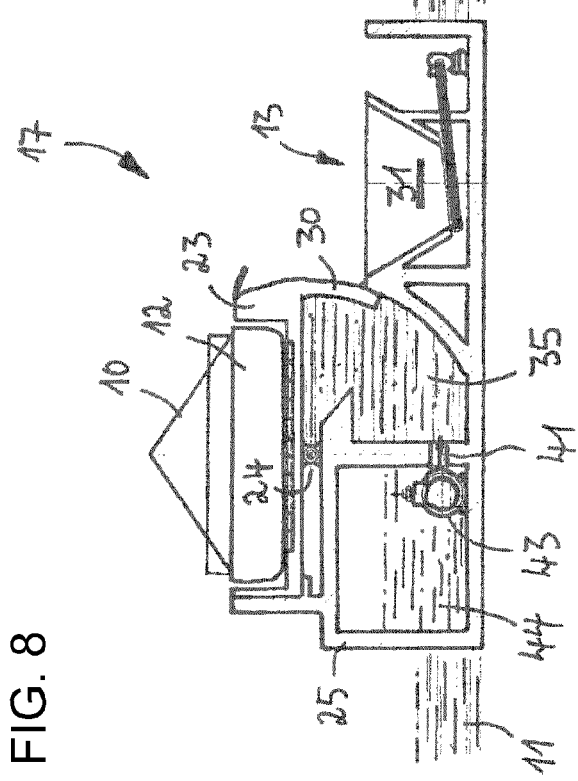

Below, further measures that improve the invention, together with a description of preferred exemplary embodiments, are provided in more detail with reference to the figures. The following are shown:

FIG. 1 an exemplary embodiment of a transfer device with a lifting lock and a tilting device according to the present invention, FIG. 2 the transfer device according to FIG. 1, wherein a barge in the lifting lock is in a raised position, FIG. 3 a top view of the transfer device according to the exemplary embodiment in FIGS. 1 and 2, FIG. 4 a cross-sectional view of the lifting lock and of a reservoir laterally arranged on the lifting lock, wherein in the lifting lock a barge in a non-raised state is shown, FIG. 5 the cross-sectional view according to FIG. 4, wherein the lifting lock is full of water, and the barge has been raised to a tilting height, FIG. 6 a cross-sectional view of the tilting device of the transfer device according to the present invention, FIG. 7 a cross-sectional view of the tilting device according to FIG. 6 with a tilting floor and a barge with bulk material, which barge is in a tilted state, FIG. 8 a further exemplary embodiment of a tilting device with a tilting floor in a non-tilted state, and FIG. 9 the exemplary embodiment of the tilting device according to FIG. 8 with a tilting floor in a tilted state.

DESCRIPTION OF THE INVENTION

FIGS. 1 and 2 each shows a lateral view of a transfer device 1 with the characteristics of the present invention. The transfer device 1 is arranged so as to be standing in a body of water 11 so that the transfer device 1 projects into the body of water 11 and below the surface 16 of the body of water.

The transfer device 1 comprises a lifting lock 14 by means of which a barge 12 can be raised from a floating height to a tilting height 15.

The transfer device 1 further comprises a tilting device 17, and the tilting device 17 is arranged so as to adjoin the lifting lock 14. FIG. 1 shows three barges 12 as an example, with each barge carrying a load of bulk material 10. However, during operation of the transfer device 1 only one barge 12 can be emptied at a time with the use of the transfer device 1. In this arrangement the three barges 12 shown thus only indicate stations through which the barges 12 move until they reach the tilting position in the tilting device 17.

In the lifting lock 14 a first barge 12 is floating in the body of water 11, wherein the barge 12 has been moved into the lifting lock 14 by a push boat 39. In order to move the barge 12 into the lifting lock 14 by means of the push boat 39, said lifting lock 14 comprises a lock gate 21 that in the discharged state of the lifting lock 14 can be opened so that the barge 12 with the push boat 39 can move into the lifting lock 14. Subsequently the lock gate 21 is closed, and water 19 can be pumped into the lifting lock 14.

The barge 12 shown in FIG. 1 is at the height of the surface 16 of the body of water, and can, as shown in FIG. 2, be brought to the tilting height 15 in that the lifting lock 14 is flooded with water 19 after the push boat 39 has moved out of the lifting lock 14. FIG. 2 shows the barge 12 with the bulk material 10 at the tilting height 15, at which the barge 12 can be transferred to the tilting device 17 which is located adjacent to the lifting lock 14. Pumps 18 are shown, which are used for flooding the lifting lock 14 with water 19, wherein the lifting lock 14 is flooded with a volume of water 19 until the barge 12 floats at the tilting height 15 shown. In order to subsequently transfer the barge 12, which is subsequently raised to the tilting height 15, to the tilting device 17, according to the invention several options are provided that are stated below.

According to a first possibility for transferring the barge 12 to the tilting device 17, a supporting floor 36 can be placed in the lifting lock 14 or can be moved in some other manner underneath the barge, onto which supporting floor 36 the barge 12 at its floatingly attained tilting height 15 is subsequently placed by discharging water 19 from the lifting lock 14. The supporting floor 36 can be moved or pivoted underneath the barge 12 when the barge 12 has attained the tilting height 15. If the water 19 has been discharged to a height level for the barge 12 to rest high and dry on the supporting floor 36, subsequently a lock wall 34 can be opened that is situated in the wall between the lifting lock 14 and the tilting device 17. FIG. 1 shows the lock wall 34 in its closed state, while FIG. 2 shows the lock wall 34 in an open state after the water 19 has been discharged to a height level below the tilting height 15 and thus below the supporting floor 36. Thus the barge 12 rests high and dry on the supporting floor 36 and be transferred, by means of the open lock wall 34, to a tilting floor 23 of the tilting device 17. Subsequently, the barge 12 with the bulk material 10 can be tilted to an inclined position by means of a tilting movement of the tilting floor 23 so that the bulk material 10 can be placed into a receiving device 13 shown in FIG. 2.

The receiving device 13 comprises a multitude of bins 31 into which bins 31 the bulk material 10 is placed when the barge 12 is tilted by means of the tilting floor 23, and from which bins 31 of the receiving device 13 the bulk material 10 can subsequently be onward transported.

According to a further possibility of transferring the barge 12, loaded with bulk material 10, from the lifting lock 14 to the tilting device 17, it can be provided to design the tilting floor 23 such that it is suitable for holding water. Thus the tilting floor 23 can be filled with water 19 to a filling height that corresponds to the filling height of the water 19 in the lifting lock 14 when the barge 12 has been raised to the tilting height 15. If at an identical water level in the lifting lock 14 and above the tilting floor 23 the lock wall 34 is opened, the barge 12 can be transferred, while floating, to the tilting floor 23. Subsequently, the water 19 can be discharged from the tilting floor 23, and the barge 12 is high and dry and can be tilted by means of the tilting floor 23 in order to pour the bulk material 10 into the receiving device 13.

In order to transfer the barge 12 from the supporting floor 36 to the tilting floor 23 or for conveying the barge 12, which is floating in the water 19, from the lifting lock 14 to the tilting device 17 a drive means 37 is provided that can pull the barge 12, by way of a traction means 38, from the lifting lock 14 to the tilting device 17. If the barge 12, resting on the supporting floor 36, is pulled onto the tilting floor 23, both the supporting floor 36 and the tilting floor 23 can comprise rolling elements 40 as shown in FIG. 2.

On the rolling elements 40 the barge 12 can roll so that the barge 12, which weighs up to 25,000 metric tons, comprising the bulk material 10 is conveyed to the tilting device 17 with the use of the drive means 37. In a manner not shown in further detail, the barge 12 can be moved back, by the drive means 37 or by a corresponding further drive means, from the tilting device 17 to the lifting lock 14.

FIG. 3 shows a top view of the transfer device 1 with the lifting lock 14 and the tilting device 17. The lifting lock 14 comprises a basic structure 20, and the tilting device 17 comprises a basic structure 25, wherein both basic structures 20 and 25 are arranged so as to adjoin one another in longitudinal direction. Between the two basic structures 20 and 25 there is the lock wall 34. Adjoining the longitudinal side of the lifting lock 14 a reservoir 22 is shown, while between the reservoir 22 and the lifting lock 14 there is a partition wall 26.

The diagram shows that the basic structure 20 of the lifting lock 14 comprises two lock walls, arranged so as to be parallel to each other, which lock walls at the end are closed by a further wall which adjoins the tilting device 17. For the purpose of moving the barge 12 with the bulk material 10 in or out, the front of the lifting lock 14 comprises a lock gate 21 (shown in its closed state), which is of a two-leaf design, with said leaves being hingeably arranged on the lock walls.

In order to fill the lifting lock 14 with water, the pumps 18 are arranged in the reservoir 22, which pumps 18 can pump water to and fro between the reservoir 22 and the lifting lock 14. To this effect the partition wall 26 comprises channels 33 through which the water can be conveyed to and fro between the lifting lock 14 and the reservoir 22. In this arrangement the channels 33 adjoin the pumps 18, and as an example four pumps 18 each with associated channels 33 are shown arranged in the reservoir 22.

Between the lifting lock 14 and the tilting device 17 the lock wall 34 can be moved, which lock wall 34 is shown in its open state. In its open state the lock wall 34 is situated on a wall of the reservoir 22, and the lock wall 34 can be moved in the direction of the arrow in order to move between the lifting lock 14 and the tilting device 17.

In the tilting device 17 a further barge 12 is shown, as an example resting on a tilting floor 23, with the tilting floor 23 comprising a roller floor with a multitude of rolling elements 40 on which the barge 12 rests. If the barge has been pulled, with the use of the drive means 37 shown and of the associated traction means 38, into position on the tilting floor 23, the tilting floor 23 with the barge 12 and the bulk material 10 can be tilted in the direction of a receiving device 13 so that the bulk material can reach a multitude of bins 31 that form the receiving device 13. If the bulk material 10 has been transferred to the receiving device 13, said bulk material 10 can subsequently be transported out of the bins 31 by means of a conveyor 32. The conveyor 32 comprises conveyor belts 32, associated with each bin 31, which conveyor belts 32 convey the bulk material 10 to a further conveyor belt 32, which forms part of the conveyor 32, in order to transport the bulk material 10 from the receiving device 13.

Each one of FIGS. 4 and 5 shows a cross-sectional view of the lifting lock 14 and of the reservoir 22 arranged so as to be adjacent to the lifting lock 14. In each case a barge 12 with bulk material 10 is shown in the lifting lock 14; in FIG. 4 the lifting lock 14 is empty, while in FIG. 5 the lifting lock 14 is full of water 19. In the empty lock the barge 12 is at the height of the surface 16 of the body of water 11, wherein as a result of filling the lifting lock 14 with water 19 said barge 12 is raised to a tilting height 15 in which the barge 12 can be transferred to the tilting device 17.

The diagram shows the lock wall 34, which is in its closed state when the lifting lock 14 does not contain water 19, and further shows that the lock wall 34 is opened in the direction of the reservoir 22 by means of a lateral movement (indicated by an arrow). If the barge 12 with the bulk material 10 is raised to the tilting height 15, the lock wall 34 is opened so that the barge can be transferred to the tilting device 17.

A pump 18 is shown that is used to fill the lifting lock 14 with the water 19, which pump 18 is situated in the reservoir 22. Water 19 can be conveyed, by way of a channel 33 in the partition wall 26, to and fro between the reservoir 22 and the lifting lock 14.

If the water 19, shown in FIG. 5, in the lifting lock 14 is drained, it can be transferred back to the reservoir 22. For example, the water 19 can be transferred from the lifting lock 14 to the reservoir 22 until the surface of the water 19 in the lifting lock 14 and the surface of the water 19 in the reservoir 22 are identical in height. Subsequently, the remaining water 19 can be discharged from the lifting lock 14 so that the potential energy that is stored in the water 19 in the reservoir 22 can be used for the renewed filling of the lifting lock 14.

FIG. 6 shows a cross-sectional view of the tilting device 17 with the tilting floor 23 onto which a barge 12 with the bulk material 10 was moved. By way of a tilt joint 24 the tilting floor 23 is tiltably held in the basic structure 25 of the tilting device 17.

The barge 12 with the bulk material 10 has a centre of gravity S, and the tilt joint 24 forms a pivot D situated laterally of the resultant shown of the centre of gravity S. In this arrangement the centre of gravity S is situated on the side of the pivot D of the tilt joint 24, which side faces away from the receiving device 13, and consequently the tilting floor 23 with the barge 12 and the bulk material 10 assumes a stable equilibrium, and consequently the tilting floor 23 can rest on a supporting projection 42.

In order to tilt the tilting floor 23 with the barge 12 and with the bulk material 10 so that the bulk material 10 is dropped into the bin 31 of the receiving device 13, a drive unit 27 is provided, which is affixed within the basic structure 25 of the tilting device 17. In this arrangement the drive unit 27 interacts with the tilting floor 23 and rotates said tilting floor 23 with the barge 12 and with the bulk material 10 on the pivot D of the tilt joint 24, as shown in more detail in FIG. 7.

FIG. 7 shows a cross section of the tilting device 17 with a tilting floor 23 and a barge 12 with bulk material 10, wherein the tilting floor 23 with the barge 12 and the bulk material 10 is shown in a tilted position so that the bulk material 10 can be poured into the bin 31 of the receiving device 13. Subsequently, the bulk material 10 can be removed from the bin 31 by way of the conveyor belts 32.

FIGS. 8 and 9 finally show a further exemplary embodiment for implementing the tilting device 17 with a tilting floor 23 that in the basic structure 25 of the tilting device 17 is tiltably arranged in the tilt joint 24 in order to tip the bulk material 10 from the barge 12 into the bin 31 of the receiving device 13.

Underneath part of the tilting floor 23 there is a water chamber 35 that can be filled with water, for example with water from the body of water 11.

By way of delimiting the water chamber 35 with the movable tilting floor 23 the volume of the water chamber 35 can be changed when the tilting floor 23 is tilted on the tilt joint 24. In this arrangement the water chamber 35 is designed so as to be pressure-proof, and the water can be pumped into the water chamber 35 and can be discharged from the water chamber 35. For filling the water chamber 35 a pump 43 is provided, which, for example, is arranged in a storage chamber 44, wherein water can be pumped from the storage chamber 44 to the water chamber 35 while simultaneously the tilting floor 23 is tilted back into the horizontal position. As a result of a valve being opened, or as a result of corresponding no-load operation of the pump 43, the water can be led back from the water chamber 35 to the storage chamber 44 so that the tilting floor 23 tilts on the tilt joint 24, and in order to discharge the bulk material 10.

Tilting of the tilting floor 23 with the barge 12 and the bulk material 10 can, for example, be attained by a centre of gravity of the tilting floor 23 that is arranged with lateral offset to the receiving device 13 relative to the tilt joint 24. If the tilting floor 23 is in the tilted position shown in FIG. 9, the bulk material 10 can be poured into the receiving device 13, wherein tilting back the tilting floor 23 into the horizontal position shown in FIG. 8 can be attained by renewed filling of the water chamber 35 with water. Conveying water into the water chamber 35 takes place with expenditure of energy, and consequently, for example, the pump 43 can be operated in order to convey the water from the storage chamber 44 through a channel 41 in the basic structure 25 back to the water chamber 35. In this arrangement the volume of the water chamber 35 increases again in that the tilting floor 23 is again moved back into the horizontal position. Thus the tilting movement from the horizontal position in the tilt bearings and the movement of the tilting floor 23 back to the horizontal position can be controlled by discharging and renewed pumping-in of water into the water chamber 35. The above requires that the arc segment 30, which is integrated in the tilting floor 23, is correspondingly sealed off against the opposite region, which is also arc-shaped, of the basic structure 25 of the tilting device 17.

The design of the invention is not limited to the preferred exemplary embodiment stated above. Instead, a number of variants are imaginable that make use of the solution presented even with embodiments whose nature basically differs from the above. All the characteristics and/or advantages mentioned in the claims, in the description or in the drawings, including design details, spatial arrangements and method-related steps can be significant in the context of the invention, both per se and in a host of different combinations. In particular, in each case the tilting device 17 shown in FIGS. 6 and 7, but also the tilting device 17 shown in FIGS. 8 and 9, can be used in conjunction with the transfer device 1 that is shown in FIGS. 1 to 3.

LIST OF REFERENCE CHARACTERS

1 Transfer device
10 Bulk material
11 Body of water
12 Barge
13 Receiving device
14 Lifting lock
15 Tilting height
16 Surface of the body of water
17 Tilting device
18 Pump
19 Water 20 Basic structure of the lifting lock
21 Lock gate
22 Reservoir
23 Tilting floor
24 Tilt joint
25 Basic structure of the tilting device
26 Partition wall
27 Drive unit
28 Pinion
29 Gear rim
30 Arc segment
31 Bin
32 Conveyor, conveyor belt
33 Channel
34 Lock wall
35 Water chamber
36 Supporting floor
37 Drive means
38 Traction means
39 Push boat
40 Rolling element
41 Channel
42 Supporting projection
43 Pump
44 Storage chamber
D Pivot
S Centre of gravity

The invention claimed is:

1. A transfer device for transferring bulk material from a barge floating on a body of water into a receiving device, the transfer device comprising:
   at least one lifting lock configured for raising the barge, while the barge is floating, to a tilting height above a surface of the body of water;
   at least one pump configured for pumping water into said lifting lock to raise the barge in a floating manner to the tilting height; and
   at least one tilting device into which the barge coming from said lifting lock is transferable, said tilting device configured for tilting the barge in order to pour the bulk material from the barge into the receiving device.

2. The transfer device according to claim 1, wherein said at least one tilting device is arranged adjacent said at least one lifting lock and/or at least one of said lifting lock or said tilting device is disposed to rest on a bottom of the body of water.

3. The transfer device according to claim 1, wherein said lifting lock comprises a basic structure with a lock gate enabling the barge to be moved into and moved out of said lifting lock, and wherein said basic structure and said lock gate are configured to be waterproof to such an extent that water can be received to at least a height in said basic structure at which the floating barge has been raised to the tilting height.

4. The transfer device according to claim 1, which comprises at least one reservoir for receiving water, wherein the water can be conveyed between said at least one reservoir and said lifting lock.

5. The transfer device according to claim 4, wherein said at least one reservoir forms a saving lock.

6. The transfer device according to claim 4, wherein said at least one reservoir is disposed adjacent said lifting lock, a common partition wall is disposed between said lifting lock and said reservoir, at least one pump is disposed in said reservoir and/or in said lifting lock, and said partition wall is formed with at least one channel by way of which water is movable to and fro between said lifting lock and said at least one reservoir.

7. The transfer device according to claim 1, which comprises a movable lock wall disposed between said lifting lock and said tilting device, said lock wall being configured to be opened in order to transfer the barge between said lifting lock and said tilting device.

8. The transfer device according to claim 1, wherein said tilting device comprises a basic structure adjacent a basic structure of said lifting lock, or integrally merged therewith, and wherein said tilting device has a tilting floor pivotally mounted by at least one tilt joint in said basic structure of said tilting device.

9. The transfer device according to claim 8, wherein said tilting floor, together with the loaded said barge, has a center of gravity and wherein said tilt joint forms a pivot, wherein the center of gravity and said pivot are laterally offset relative to one another such that said tilting floor together with the barge assumes a stable position in a non-tilted state.

10. The transfer device according to claim 9, wherein said tilting device comprises a drive unit for tilting said tilting floor together with the loaded barge, said drive unit including at least one driven pinion configured to mesh with a gear rim arranged on said tilting floor.

11. The transfer device according to claim 10, wherein said tilting floor comprises an arc segment extending around said pivot, said gear rim is formed on the arc segment, and the driven pinion is incorporated in the basic structure of said tilting device.

12. The transfer device according to claim 1, wherein said tilting device comprises a water chamber incorporated in a basic structure of said tilting device and partially movably delimited by said tilting floor, wherein a volume of water held in said water chamber is changeable, causing a change in the volume of water in the water chamber for inducing a tilting movement of the tilting floor.

13. The transfer device according to claim 1, wherein the receiving device includes at least one bin into which bulk material can be poured, and wherein at least one conveyor is disposed to convey the bulk material from said bin.

14. A method of transferring bulk material from a barge floating on a body of water into a receiving device by way of a transfer device, the method comprising the following steps:
   raising the barge, while the barge is floating, with a lifting lock for lifting the barge;
   pumping water, with at least one pump, into the lifting lock in order to raise the barge in a floating manner to a tilting height above surface of the body of water;
   transferring the barge from the lifting lock into a tilting device; and
   tilting the barge with the tilting device to thereby pour the bulk material from the barge into the receiving device.

15. The method according to claim 14, wherein the step of transferring the barge to the tilting device includes moving a lock wall out of an arrangement that partly separates the lifting lock from the tilting device.

16. The method according to claim 15, wherein the tilting device features a tilting floor that is configured to hold water so that, after the lock wall has been deployed, the water level of the lifting lock and of the tilting device is identical so that the barge is transferred, while floating, from the lifting lock to the tilting device.

17. The method according to claim 15, which comprises introducing a supporting floor to the lifting lock, moving the barge onto the supporting floor at the tilting height of the barge, discharging the water, wherein the supporting floor has a height that corresponds to the height of the tilting floor so that the barge is transferred, by a drive, from the supporting floor to the tilting floor.

18. The method according to claim 14, which comprises providing two lifting locks and reciprocally transferring the barges on both sides of the lifting locks to the tilting device.

19. The method according to claim 14, which comprises lifting the at least one barge with the at least one lifting lock and simultaneously tilting the at least one barge with the at least one tilting device.

\* \* \* \* \*